United States Patent
Meng et al.

(10) Patent No.: US 10,448,247 B2
(45) Date of Patent: *Oct. 15, 2019

(54) METHOD AND APPARATUS FOR INFORMATION VERIFICATION

(71) Applicant: Alibaba Group Holding Limited, Grand Cayman (KY)

(72) Inventors: Chao Feng Meng, Hangzhou (CN); Xiaowei Chen, Hangzhou (CN); Lingyun Chen, Hangzhou (CN); Feng Zhu, Hangzhou (CN); Ji Xu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,963

(22) Filed: Sep. 29, 2016

(65) Prior Publication Data

US 2017/0019786 A1    Jan. 19, 2017

Related U.S. Application Data

(63) Continuation of application No. 14/108,109, filed on Dec. 16, 2013, now Pat. No. 9,485,260.

(30) Foreign Application Priority Data

Dec. 18, 2012 (CN) .......................... 2012 1 0551710

(51) Int. Cl.
*H04L 29/06* (2006.01)
*H04W 12/06* (2009.01)
(Continued)

(52) U.S. Cl.
CPC ............ *H04W 12/06* (2013.01); *G06F 21/36* (2013.01); *G06Q 20/4014* (2013.01);
(Continued)

(58) Field of Classification Search
CPC . H04L 63/123; H04L 63/083; H04L 63/0838; H04L 63/0846; G06F 21/36; G06F 21/31; H04W 12/06; H04W 88/02
(Continued)

(56) References Cited

U.S. PATENT DOCUMENTS

| | | | |
|---|---|---|---|
| 5,283,943 A * | 2/1994 | Aguayo | G05B 19/41805 29/701 |
| 5,956,045 A * | 9/1999 | Gotoh | G06F 3/04847 345/156 |

(Continued)

FOREIGN PATENT DOCUMENTS

| | | |
|---|---|---|
| CN | 101159715 A | 4/2008 |
| CN | 101501619 A | 8/2009 |

(Continued)

OTHER PUBLICATIONS

The Chinese Office Action dated Apr. 5, 2017 for Chinese Application No. 201210551710.4, a counterpart foreign application of U.S. Appl. No. 14/108,109, 33 pages.

(Continued)

*Primary Examiner* — Matthew T Henning
(74) *Attorney, Agent, or Firm* — Lee & Hayes, P.C.

(57) ABSTRACT

A method and an apparatus includes a terminal device that recognizes a sequence of click operations made by the user according to a maneuver prompted on a terminal device. The sequence of click operations carries operation information from which a click pattern characteristic, such as a characteristic code, can be determined. Upon receiving the determined click pattern characteristic, a server verifies the user input by matching the click pattern characteristic with a verification code set or stored by the server. The click pattern (Continued)

characteristic may be based on recognizing clicking or tapping operations performed by the user at a specified time and/or in a designated area.

14 Claims, 5 Drawing Sheets

(51) Int. Cl.
  *G06F 21/36* (2013.01)
  *G06Q 20/40* (2012.01)
  *H04W 88/02* (2009.01)
  *H04W 12/00* (2009.01)

(52) U.S. Cl.
  CPC .......... *H04L 63/083* (2013.01); *H04L 63/123* (2013.01); *H04W 12/00508* (2019.01); *H04W 88/02* (2013.01)

(58) Field of Classification Search
  USPC ............................................................. 726/7
  See application file for complete search history.

(56) References Cited

U.S. PATENT DOCUMENTS

| | | | | |
|---|---|---|---|---|
| 6,246,769 | B1* | 6/2001 | Kohut | G06Q 20/341 380/45 |
| 6,257,486 | B1* | 7/2001 | Teicher | G06K 7/0021 235/380 |
| 6,509,847 | B1 | 1/2003 | Anderson | |
| 9,485,260 | B2* | 11/2016 | Meng | H04L 63/123 |
| 2001/0036297 | A1* | 11/2001 | Ikegami | G06F 21/32 382/115 |
| 2003/0093699 | A1 | 5/2003 | Banning et al. | |
| 2004/0010604 | A1* | 1/2004 | Tanaka | G06F 17/30011 709/229 |
| 2004/0143767 | A1 | 7/2004 | Schreiber et al. | |
| 2005/0008148 | A1 | 1/2005 | Jacobson | |
| 2006/0206919 | A1 | 9/2006 | Montgomery et al. | |
| 2007/0250920 | A1* | 10/2007 | Lindsay | G06F 21/31 726/7 |
| 2008/0148393 | A1* | 6/2008 | Wendt | G06F 21/32 726/19 |
| 2009/0287937 | A1* | 11/2009 | Burden | H04L 9/3271 713/185 |
| 2011/0053558 | A1 | 3/2011 | Teague | |
| 2011/0239282 | A1* | 9/2011 | Svarfvar | H04L 63/0815 726/5 |
| 2011/0274259 | A1 | 11/2011 | Eng et al. | |
| 2012/0011066 | A1 | 1/2012 | Telle et al. | |
| 2012/0278759 | A1* | 11/2012 | Curl | G16H 40/20 715/804 |
| 2012/0278879 | A1 | 11/2012 | Ganem | |
| 2013/0326604 | A1* | 12/2013 | Hird | G06F 21/31 726/7 |
| 2014/0024330 | A1* | 1/2014 | Chu | H04M 1/72541 455/404.1 |
| 2014/0173710 | A1 | 6/2014 | Meng et al. | |
| 2015/0072648 | A1* | 3/2015 | Bravo | H04W 12/08 455/411 |

FOREIGN PATENT DOCUMENTS

| | | |
|---|---|---|
| CN | 102385449 A | 3/2012 |
| CN | 102508611 A | 6/2012 |
| CN | 102592088 A | 7/2012 |
| CN | 102609659 A | 7/2012 |
| CN | 102739620 A | 10/2012 |

OTHER PUBLICATIONS

The Chinese Office Action dated Aug. 1, 2016 for Chinese Application No. 201210551710.4, a counterpart foreign application of U.S. Appl. No. 14/108,109, 25 pages.

Final Office Action for U.S. Appl. No. 14/108,109, dated Oct. 15, 2015, Chao Feng Meng, "Method and for Apparatus Information Verification", 13 pages.

Office action for U.S. Appl. No. 14/108,109, dated Feb. 12, 2016, Meng et al., "Method and Apparatus for Information Verification", 13 pages.

Office Action for U.S. Appl. No. 14/108,109, dated Jul. 6, 2015, Chao Feng Meng, Method and Apparatus for Information Verification, 10 pages.

PCT Search Report and Written Opinion dated Apr. 28, 2014 for PCT Application No. PCT/US13/75479, 8 Pages.

The European Office Action dated Nov. 30, 2016 for European Patent Application No. 13818596.2, a counterpart foreign application of U.S. Pat. No. 9,485,260, 4 pages.

Translated copy of the Chinese Office Action dated Apr. 2, 2018, for corresponding Chinese Patent Application No. 201210551710.4, 18 pages.

* cited by examiner

METHOD AND APPARATUS FOR INFORMATION VERIFICATION

RELATED PATENT APPLICATIONS

This application is a continuation of and claims priority to U.S. patent application Ser. No. 14/108,109, filed on Dec. 16, 2013, now U.S. Pat. No. 9,485,260, entitled "METHOD AND APPARATUS FOR INFORMATION VERIFICATION," which claims foreign priority to Chinese Patent Application No. 201210551710.4 filed on Dec. 18, 2012, entitled "METHOD AND APPARATUS FOR INFORMATION VERIFICATION", all of which are hereby incorporated by reference in their entirety.

TECHNICAL FIELD

This application relates to the field of communications technology, particularly to a method and apparatus for verification of information.

BACKGROUND

With the development of network technology, users can have access to a variety of network services, such as information search, online shopping, e-mail and so on. When a user accesses a network service, the server usually requires the user to verify certain information.

For example, the user is typically required to enter a username and a password to conduct online shopping, to communicate with other users via instant messaging software, or to send and receive messages via e-mail. The server checks the user-entered username and password, and provides the appropriate network services only if the user information passes the check.

For another example, in order to defend against malicious denial of service attacks using massive robotic external communications requests that saturate a target server, Internet servers now usually differentiate a human user from a machine using methods such as CAPTCHA techniques. For example, the server sends a scrambled image that contains a verification code, and prompts the user to enter the verification code contained in the scrambled image, and allows the user to continue to use the service only if the returned verification code is correct. The method is broadly used in various Internet services such as information search.

The verification codes or passwords are usually entered by the user through a keyboard of the user terminal device.

Currently, a variety of mobile devices have been widely used. Users can obtain network services through mobile devices such as smart phones, tablets and other smart mobile devices, in addition to traditional personal computers. Due to the general miniaturization of mobile devices, and the fact that current verification codes, such as passwords, authentication codes or challenge codes, are usually a mixture of numbers and letters (sometimes even case-sensitive), it is inconvenient for a user to enter such verification information on a mobile devices. The lack of a sufficient keyboard often leads to erroneous input, and as a consequence false information is frequently submitted to the server for verification. As the server denies service due to an error, the user will have to re-enter the verification code, and the server then needs to re-process the verification code resubmitted by the user, resulting in excessive load stress on the server.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure provides a method and an apparatus for verifying information. According to one embodiment of the method, a terminal device recognizes a sequence of click operations made by a user prompted by a maneuver on the terminal device. The method determines a click pattern characteristic of the sequence of click operations made by a user, and verifies the user at the server by matching the click pattern characteristic with a verification code set or stored by the server. The method may further provide instructions for the user to perform the sequence of click operations in a specified time and/or in a specified area on a screen of the terminal device. The click pattern characteristic may include a characteristic code, and the characteristic code is matched with the verification code set or stored by the server.

The click pattern characteristic may have at least one of following features: a count of clicks in the sequence, click duration of each click, and an order of the clicks in the sequence. For example, the click pattern characteristic may be encoded using a coding scheme that defines at least two ranges of click duration, and assigns an alphanumerical digit to each predefined range of click duration. Alternatively, the click pattern characteristic may be encoded using a coding scheme that defines at least two ranges of inter-click interval, and assigns an alphanumerical digit to each predefined range of inter-click interval. Each of these alternative encoding schemes, or a combination thereof, may be used to generate a verification code which combines the alphanumerical digits of multiple clicks in the sequence. When a mixed scheme is used, a verification code may be generated by combining the alphanumerical digits of different types.

In one embodiment, the method determines an alphanumerical code of the sequence of click operations according to an encoding scheme. The alphanumerical code includes alphanumerical digits each determined according to a click duration of a respective click in the sequence of click operations and/or according to an interval between a respective pair of clicks. The alphanumerical code so determined is taken as the click pattern characteristic of the sequence of click operations. Accordingly, the server matches the alphanumerical code of the sequence of click operations with the verification code set or stored by the server in order to verify the user.

The click pattern characteristic of the sequence of click operations may be determined at the terminal device, and then send to the server for verification. Alternatively, the server may receive operation information of the sequence of click operations made by the user, and then may determine the click pattern characteristic from the received operation information of the sequence of click operations. The operation information of the sequence of click operations may include at least one of following information of each click: click location, click time, and click duration. According to one embodiment, to determine the click pattern characteristic from the operation information of the sequence of click operations, the method selects from the sequence of click operations those with a click location in a designated area and/or those with a click time in a specified time period, and determines the click pattern characteristic from the operation information of the selected clicks.

According to another embodiment of a method for verifying information, a server receives a sequence of click operations made by a user on a terminal device in response to a maneuver prompted on the terminal device. The maneuver is defined according to a verification code set or stored by a server. The server then determines a click pattern characteristic of the sequence of click operations made by the user, and verifies the user by matching the click pattern characteristic with the verification code set or stored by the server.

Another aspect of the present application discloses a computer-based apparatus for processing online information verification. The apparatus has a server computer having a processor, memory, and I/O devices. The server computer is programmed to have the following functional modules: a receiving module configured to receive a sequence of click operations made by a user on a terminal device in response to a maneuver prompted on the terminal device, the maneuver being defined according to a verification code set or stored by a server; a determining module configured to determine a click pattern characteristic of the sequence of click operations made by the user; and a verifying module configured to verify the user by matching the click pattern characteristic of sequence of click operations and the verification code set or stored by the server.

The server computer may be programmed to further have a prompting module configured to prompt instructions for the user to perform the sequence of click operations in a specified time and/or in a specified area on a screen of the terminal device.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

DETAILED DESCRIPTION

In order to facilitate understanding of the above purpose, characteristic and advantages of the present disclosure, the present disclosure is described in further detail in conjunction with accompanying figures and example embodiments. In the description, the term "technique(s)," for instance, may refer to method, apparatus device, system, and/or computer-readable instructions as permitted by the context above and throughout the present disclosure.

Instead of using the traditional methods of entering a verification code through a keyboard, the present disclosure provides a method for the user to enter a verification code by performing click operations on a user terminal. The method determines a click pattern characteristic of a sequence of click operations and uses it as the verification code entered by the user. In one embodiment, the user terminal determines the click pattern characteristic and sends it to the server for verification. In another embodiment, the user terminal sends operation information of the sequence of click operations to the server, which then determines the click pattern characteristic of the received sequence of click operations, and uses it as verification code.

Figure 1:
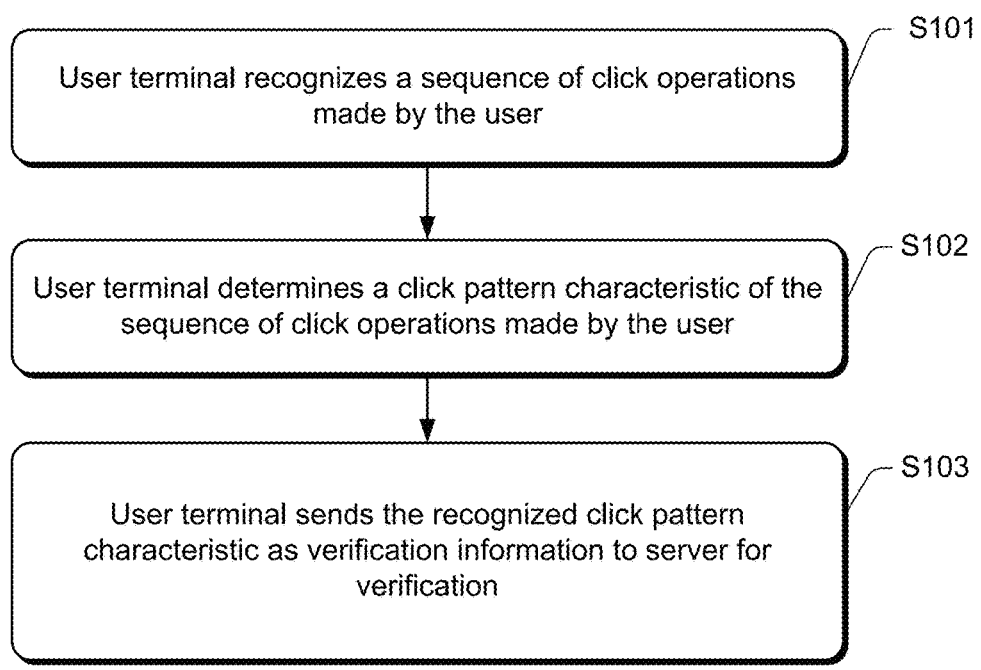
FIG. 1 is a flowchart of an information verification process in accordance with the first embodiment of the present disclosure.

FIG. 1 is a flowchart of an information verification process in accordance with the first embodiment of the present disclosure. The process is described according to the following blocks. In this description, the order in which a process is described is not intended to be construed as a limitation, and any number of the described process blocks may be combined in any order to implement the method, or an alternate method.

Block S101: A user terminal device recognizes click operations made by the user.

In the present disclosure, the term "click" broadly refers to a gesture made with an input device such as a mouse or a touchscreen. A click may be a mouse click in the traditional sense, a click using a stylus, or a tap by a finger on a touchscreen. In a typical application, the user terminal device prompts a maneuver for the user to make a sequence of click operations. The maneuver is defined according to a verification code set or stored by a server. The maneuver may provide instructions for the user to perform the sequence of click operations. The sequence of click operations may be specified according to a specified timed pattern and/or a specified area, as described herein. The user terminal device recognizes the click operations as the user follows the maneuver to make the sequence of click operations.

The method disclosed herein enables the user to enter a verification code by directly making click operations on the user terminal device without reliance on a keyboard. That is, the user may enter the verification code by directly making click operations on the screen of the user terminal, and the entered click operations are recognized by the user terminal device without having to use a keyboard.

Specifically, the user terminal may prompt the user to make a click operation at a specified time, or prompt the user to make a click operation in a designated area on a screen of the user terminal. As the user makes the prompted click operations, the user terminal recognizes such click operations performed by the user at the specified times or in the designated area(s). The user terminal may also recognize such click operations performed by the user both at the specified times and in the designated area. The designated area for click operations may be set according to needs. For example, for user convenience for making click operations, the designated area is preferably of a reasonable size. The above specified time may also be set according to needs. For example, the time for the user to complete the click operation may be set to be 10 seconds.

Figure 2:
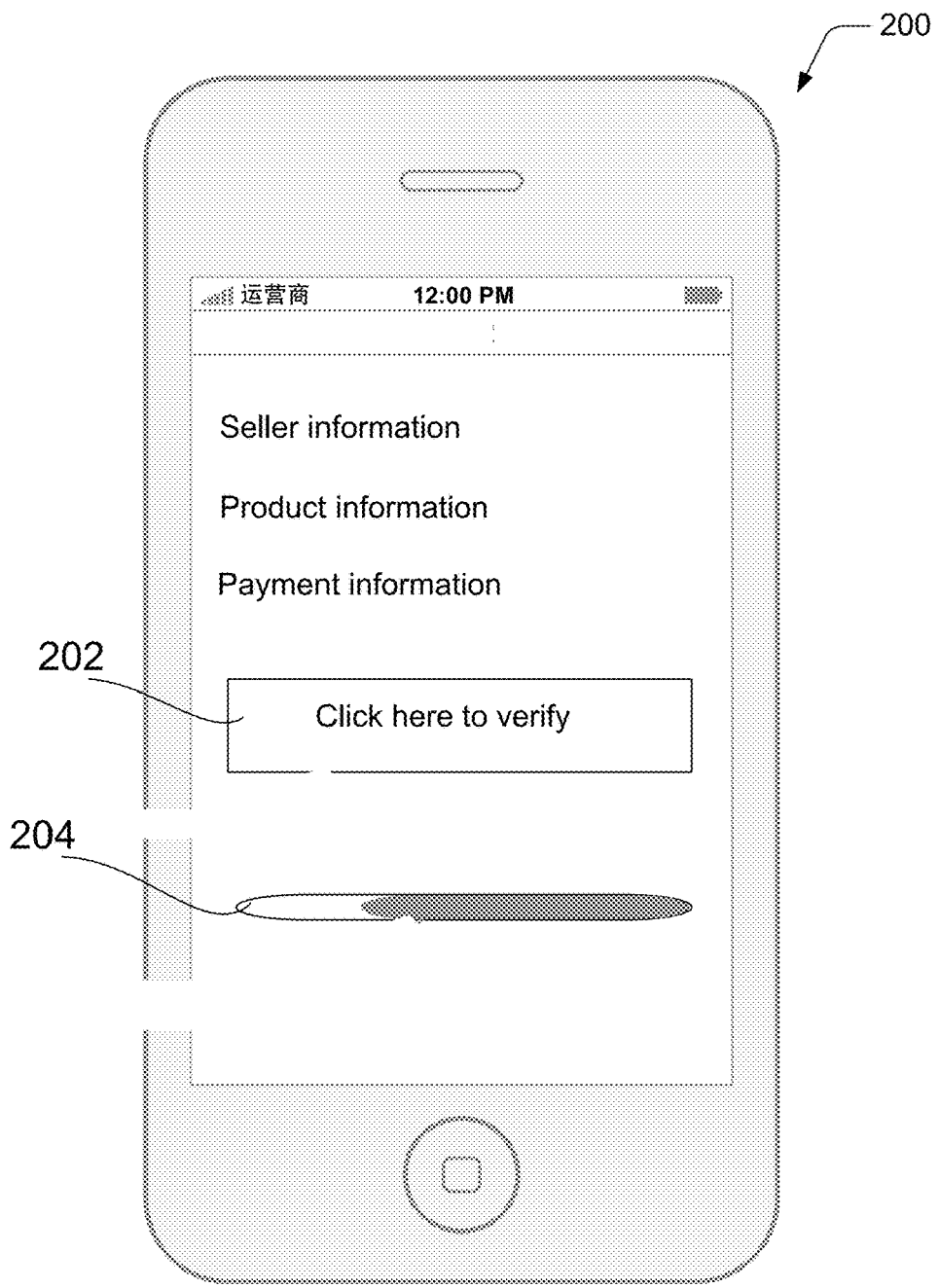
FIG. 2 is an interface schematic showing a user terminal rendering a maneuver prompting the user to perform a click operation at a specified time in a designated area.

For example, FIG. 2 is an interface schematic showing a user terminal rendering a maneuver prompting the user to perform a click operation at a specified time in a designated area. As shown in FIG. 2, during online shopping, when the user is ready to make payment, the user terminal 200 prompts the user to make a click operation in the designated area 202 at the time specified by a time indicator (e.g. a time projection bar 204 which indicates the remaining time). The designated area 202 and the time projection bar 204 are prompted on the screen of the user terminal 200. In addition, the user terminal to hundred also shows other information, such as a buyer information, product information, and payment information.

At block S102, the user terminal determines a click pattern characteristic of the sequence of click operations made by the user.

Upon recognizing the click operations made by the user, the user terminal may determine a click pattern characteristic of the recognized sequence of click operations made by the user. In accordance with one embodiment, the user terminal recognizes operation information such as the number of clicks counted in the sequence, the click duration of each click, and the order of the clicks in the sequence having different click durations, and may take at least one piece of such operation information as the click pattern characteristic of the sequence of click operations recognized.

For example, based on the order of the recognized click operations, the user terminal sequentially determines the click duration of each click, and then determines a characteristic code for each click based on the respective click duration. Such determination may use preset ranges of click duration, each range corresponding to a characteristic code. The click operation is considered to have a particular characteristic code if its click duration falls into a corresponding range. The characteristic codes of the sequence of click operations are taken as the click pattern characteristic for the purpose of verification.

With the above example, suppose the user has made a total of five click operations within ten seconds (the specified time), and the five clicks have a click duration of 0.4 seconds, 1.3 seconds, 1.4 seconds, 0.6 seconds, and 1.4 seconds, respectively. The preset ranges of click duration are defined using an encoding scheme as follows: a click duration of 0-1 seconds corresponds to a characteristic code "0", and a click duration above 1 second corresponds to a characteristic code of "1". As a result, based on the order of the five click operations recognized, the characteristic code for each click is determined to be, in order, 0, 1, 1, 0, and 1, respectively. Accordingly, the user terminal may formulate a code 01101, which represents the sequentially combined characteristic codes of the sequence of click operations recognized, and take the code 01101 as the click pattern characteristic for the purpose of verification.

The click pattern characteristic code 01101 determined in this manner carries a coded message. From the code 01101, it can be learned that the user performed a total of five click operations within the specified time 10 seconds in the designated area. The length of the characteristic code 01101, which has five individual characteristic codes, indicates a total of five clicks that meet the requirement. The characteristic code 01101 also indicates the ranges of the click durations (wherein "0" indicates a click with a click duration in the range of 0-1 second, and "1" indicates a click with the click duration in the range above 1 second). In addition, the sequential order of the five clicks of various click durations may also be learned from the characteristic code 01101.

At block S103, the user terminal sends the click pattern characteristic as the verification code to the server for verification.

Upon determining the click pattern characteristic of the sequence of click operations, the user terminal takes the determined click pattern characteristic as the verification code and sends it to the server for verification.

In the above example, the user terminal sends characteristic code 01101 as the verification code entered by the user to the server. The server treats the characteristic code 01101 as the verification code entered by the user and performs verification. Specifically, the server may look up a verification code set or stored by the server for the account of the user who is logged on, and compares the received verification code 01101 with the verification code set or stored by the server. If the two match, the verification is successful. Otherwise, the verification fails.

In one application scenario, the verification method is used for the user to enter a saved account passcode, which is a type of verification code stored by a server in the meaning of the present disclosure. When the user initially registers for a user account, the server saves a passcode to be used for verifying the user's account. During the user account registration, the user terminal may prompt the user to enter a username, and prompt the user to make a sequence of click operations. The user terminal then recognizes the sequence of click operations made by the user and determines the click pattern characteristic of the sequence of click operations, takes the determined click pattern characteristic as the user entered passcode, and sends the username and the passcode entered by the user to the server in order to register an account for the user. The server then saves the received passcode and uses it for verifying the corresponding user account. During a subsequent user logon verification, the user enters a sequence of click operations on the user terminal, which determines a user entered verification code according to a click pattern characteristic, and sends the user entered verification code to the server, which compares the received verification code with the saved user account passcode for verification.

In the above example, the preset ranges of click duration and the corresponding characteristic codes may be set according to needs. For example, in order to make it convenient for users to enter the verification code by making click operations, the corresponding relationship between the ranges of click duration and the characteristic codes may be made simple. On the other hand, in order to increase the level of security, the corresponding relationship between the ranges of click duration and the characteristic codes may be made more complex. For example, according to one encoding scheme, a range of 0-1 second of a click duration corresponds to a characteristic code "0"; a range of 1-2 seconds corresponds to a characteristic code "1"; a range of 1-2 seconds corresponds to a characteristic code "2"; a range of 3-4 seconds corresponds to a characteristic code "3"; and above 4 seconds corresponds to a characteristic code "4".

In a more complex scheme, the click pattern characteristic may be a combination of multiple pieces of information, including: the total number of clicks recognized, the click duration of each click, the order of the clicks of various click durations, and inter-click intervals between two sequentially neighboring clicks. In this scheme, in addition to the corresponding relationship between the ranges of click duration and the characteristic codes, a corresponding relationship between ranges of inter-click intervals and the characteristic codes may also be defined and used.

For example, suppose within 10 seconds (the specified time) the user has made a total of five click operations in the designated area. The five clicks have a click duration of 0.4 seconds, 1.3 seconds, 1.4 seconds, 0.6 seconds and 1.4 seconds, respectively, and the inter-click intervals of each sequentially neighboring clicks are 0.6 seconds, 0.8 seconds, 0.5 seconds, and 1.3 seconds.

Suppose the preset corresponding relations between the ranges of click durations and characteristic codes are: a range of 0-1 second of a click duration corresponds to a characteristic code "0", and above 1 second corresponds to a characteristic code "1". The preset corresponding relations between the ranges of inter-click intervals and characteristic codes are: a range 0-1 second of an inter-click interval corresponds to a characteristic code "A", and above 1 second corresponds to a characteristic code "B".

According to the above encoded scheme of preset relations, the user terminal determines a characteristic code 01101 based on the click durations of the five click operations, and determines another characteristic code AABB based on the inter-click intervals of the sequentially neighboring clicks. The user terminal may formulate a click pattern characteristic using a combination of these two characteristic codes. For example, a combination code may be AABB01101, 0A1A1A0B1, or 01101AABB, and any one of these combinations may be used as a user-entered verification code based on the click pattern characteristic of the sequence of five click operations entered by the user for verification.

Using the above method, the user may enter a verification code directly using click operations without having to use a keyboard to input complex numerous and letters. A reasonably sophisticated alphanumerical code having multiple alphanumerical digits such as described in the above example may be formulated using a method described herein, and used as verification code entered by the user. Therefore, the user may conveniently enter a verification code on a small mobile devices with low input error rate. As a result, the server processes fewer incorrect verification codes and is less stressed in resources.

In another application scenario, the verification method is used for verifying a CAPTCHA type challenge code entered by the user.

For example, when a user performs a search on an information search site, the search engine may require the user to enter a challenge code to verify that the user is legitimate (i.e., a human instead of a robot). The challenge code is a type of verification code set by the server. As the user intends to perform a search, the server may generate a random challenge code and send the prompting information associated with the challenge code to the user terminal. The prompting information requires the user to enter a code that matches the challenge code before being allowed to use the search service.

Suppose the challenge code randomly generated by the server is "110", using the above-described example of encoding scheme, the server may send corresponding prompting information containing user instructions) such as "please sequentially perform two long clicks followed by a short one, where the long click is longer than 1 second, and the short click is shorter than 1 second." The prompting information may be generated by the server and sent to the user terminal to be displayed to the user. Upon receiving the prompting information, the user may perform a sequence of click operations according to the instructed time and the designated area displayed on the screen. The user terminal then recognizes the sequence of click operations (see block S101 of a process according to FIG. 1), determines the click pattern characteristic of the sequence of click operations made by the user (see block S102 of FIG. 1). In this case, the click pattern characteristic is a code "110". The user terminal then sends the determined click pattern characteristic (code "110") to the server as the challenge code (verification code) entered by the user (see uses block S103 of FIG. 1). The server compares the received challenge code with the previously server-generated challenge code to complete the user verification.

It should be noted that the user terminal is not limited to a mobile device or a personal computer. When a personal computer is used, the click operations may be done using a mouse or another input device. Accordingly, the personal computer recognizes the click operations made by the mouse or the other input device, and performs subsequent acts as described herein. When a mobile device is used, the click operations maybe done using a touchscreen (either a capacitive type or a resistive type) which recognizes tapping or other click equivalents, and accordingly the mobile device performs subsequent acts.

In the above described embodiment of the method for information verification, the user terminal device (such as a mobile device) determines the click pattern characteristic and sends it to the server.

Figure 3:
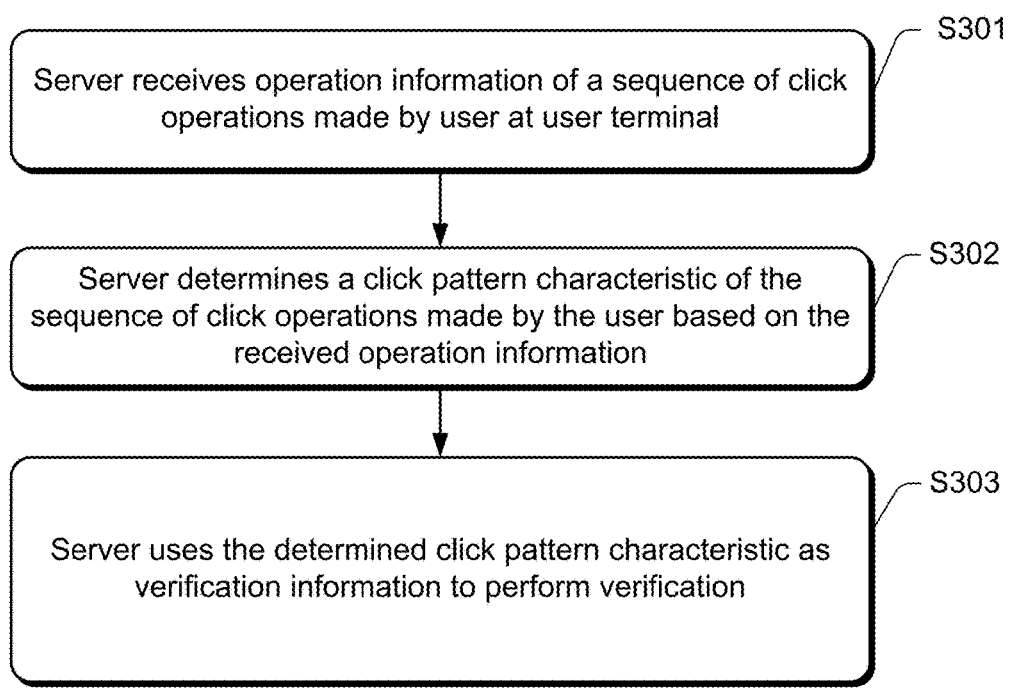
FIG. 3 a flowchart of an information verification process in accordance with the second embodiment of the present disclosure.

FIG. 3 a flowchart of an information verification process in accordance with the second embodiment of the present disclosure.

At block S301, a server receives operation information of a sequence of click operations performed by the user through a user terminal. In this embodiment, the user still enters verification information by performing click operations directly on the terminal device, which then recognizes the click operations performed by the user.

In contrast to the method according to FIG. 1, in this embodiment according to FIG. 3, upon recognizing the click operations made by the user, at block S302, the user terminal sends the original operation information of the clicks (i.e., original operation information corresponding to each clicks) to the server to allow the server to determine the click pattern characteristic of the sequence of click operations. The user terminal itself does not further process the operation information to determine the click pattern characteristic.

The operation information corresponding to each click carries information concerning the click position (specifically the coordinates of the point on the user terminal screen where the click was made), the click time (the time when the click was performed), and the click duration (the length of the time the click was pressed). Using a method similar to that described according to FIG. 1, the server may use the received operation information to determine the click pattern characteristic.

For example, the server may select among the sequence of clicks those that have a click position in the designated area, based on the click position information carried in the operation information. Alternatively, the server may select among the sequence of clicks those that have a click time in the specified time period. The server may also select those clicks with both its click position and click time meeting the requirements. The server may then determine the click pattern characteristic of the selected clicks based on the operation information of the selected clicks.

The server may use at least one of the following types of information as the click pattern characteristic of the selected clicks: the number of selected clicks, the click duration of each selected click, the order of the selected clicks of various click directions. The order of the selected clicks is determined based on the click times of the clicks. Based on the determined order, the click duration of each selected click is determined sequentially based on the click operation information received. For each selected click, a characteristic code is determined based on the preset range into which the click duration of the respective click falls. Finally, the click pattern characteristic in a form of a code is formulated by combining the characteristic codes of the selected clicks. The method used for determining the click pattern characteristic is similar to that described with FIG. 1, and is not repeated.

At block S303, the server uses the determined click pattern characteristic to verify the user input by verifying the click pattern characteristic received.

Both the embodiments of FIG. 1 and FIG. 3 may be used to effectively lower the error rate of user input when entering verification information, and thus lower the stress on the servers.

The above-described techniques may be implemented with the help of one or more non-transitory computer-readable media containing computer-executable instructions. The non-transitory computer-executable instructions enable a computer processor to perform actions in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

In connection to the method disclosed herein, the present disclosure also provides a computer-based apparatus for processing online transactions.

In the presence disclosure, a "module" in general refers to a functionality designed to perform a particular task or function. A module can be a piece of hardware, software, a plan or scheme, or a combination thereof, for effectuating a purpose associated with the particular task or function. In addition, delineation of separate modules does not necessarily suggest that physically separate devices are used. Instead, the delineation may be only functional, and the functions of several modules may be performed by a single combined device or component. When used in a computer-based system, regular computer components such as a processor, a storage and memory may be programmed to function as one or more modules to perform the various respective functions.

Figure 4:
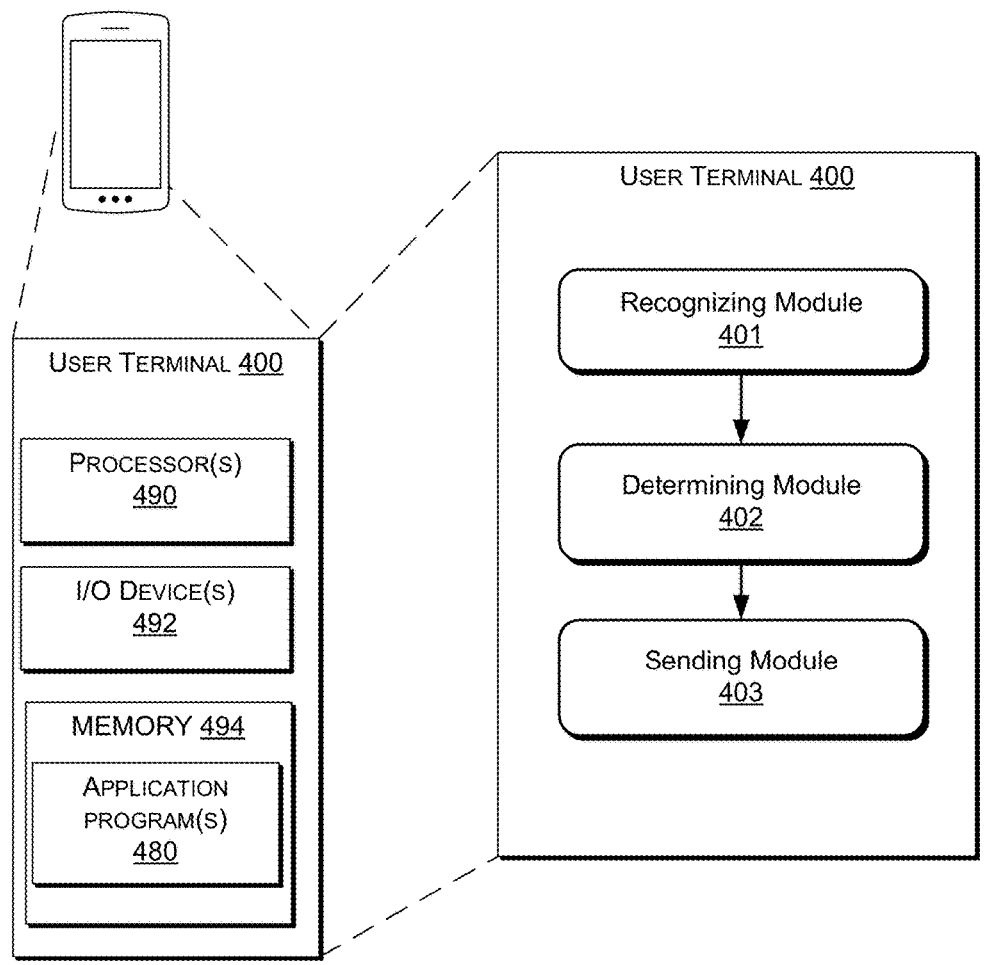
FIG. 4 is a schematic block diagram of an apparatus based on the process embodiment shown in FIG. 1.

FIG. 4 is a schematic block diagram of an apparatus based on the process embodiment shown in FIG. 1. Mobile user terminal 400 has one or more processor(s) 490, I/O devices 492, memory 494 which stores application program(s) 480.

The memory 494 (and 594 in FIG. 5) may include computer-readable media in the form of volatile memory, such as random-access memory (RAM) and/or non-volatile memory, such as read only memory (ROM) or flash RAM. The memory 494 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

The mobile user terminal 400 is programmed to have the following functional modules:

a recognizing module 401, configured to recognize a sequence of click operations made by the user according to a maneuver prompted by the terminal device;

a determining module 402, configured to determine a click pattern characteristic of the sequence of click operations made by a user; and a sending module 403, configured to send the determined click pattern characteristic to ease server, which verifies the user by matching the click pattern characteristic of the sequence of click operations made by the user with a verification code set or stored by the server.

The determining module 402 may determine the click pattern characteristic using a method similar to the process described with FIG. 1.

Figure 5:
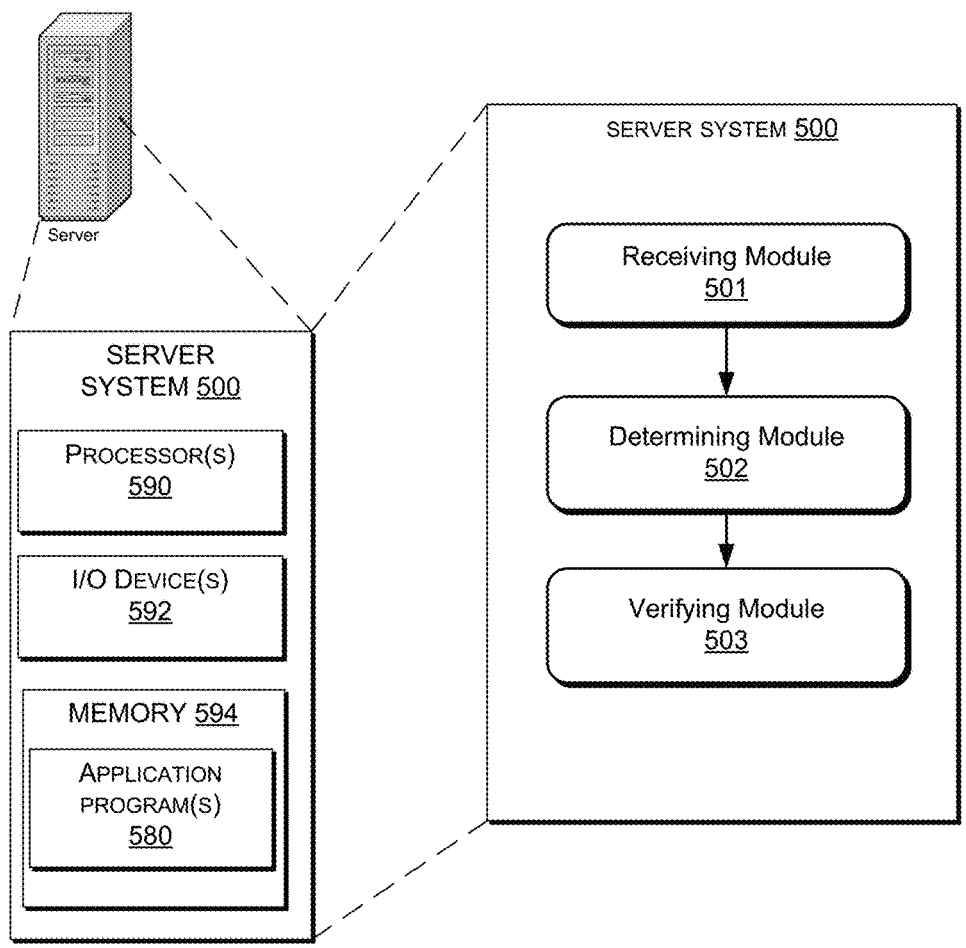
FIG. 5 is a schematic block diagram of an apparatus based on the process embodiment shown in FIG. 3.

FIG. 5 is a schematic block diagram of an apparatus based on the process embodiment shown in FIG. 3. A server system 500 has one or more processor(s) 590, I/O devices 592, memory 594 which stores application program(s) 580.

The server system 500 is programmed to have the following functional modules:

a receiving module 501, configured to receive a sequence of click operations made by a user on a terminal device, wherein the sequence of click operations are made by the user in response to a maneuver prompted on the terminal device, the maneuver being defined according to a verification code set or stored by a server;

a determining module 502, configured to determine a click pattern characteristic of the sequence of click operations made by the user; and a verifying module 503, configured to verify the user by matching the click pattern characteristic of sequence of click operations with the verification code set or stored by the server.

The determining module 502 may determine the click pattern characteristic using a method similar to the process described with FIG. 3.

In one embodiment, the server system 500 is programmed to further have a prompting module configured to prompt instructions for the user to perform the sequence of click operations in a specified time and/or in a specified area on a screen of the terminal device.

It is appreciated that the potential benefits and advantages discussed herein are not to be construed as a limitation or restriction to the scope of the appended claims.

Methods and apparatus of information verification have been described in the present disclosure in detail above. Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields.

What is claimed is:

1. A method for verifying information, the method comprising:
 prompting, by a server, entry of a code by a user within a specified time indicated by a time indicator on a screen of a device;
 entering the code by the user by performing a sequence of click operations on the screen of the device;
 recognizing, at the device, the sequence of click operations made by the user, wherein each click operation corresponds to an alphanumerical digit of a code;
 selecting click operations with a click location in a designated area, with a click time falling in a designated time period, or with a click location in a designated area and a click time falling in a designated time period, the click location being coordinates of a point on the screen of the device where the click operation is made;
determining a click pattern characteristic of the sequence of click operations made by the user,
wherein the click pattern characteristic includes at least one of a count of clicks in the sequence, a click duration of each click in the sequence, or an order of the clicks in the sequence, and
wherein the click pattern characteristic is encoded using a coding scheme including:
defining at least two ranges of click duration, and assigning an alphanumerical digit of a first type to each predefined range of click duration,
defining at least two ranges of inter-click interval, and assigning an alphanumerical digit of a second type to each predefined range of inter-click interval; and
generating an alphanumeric code by combining the alphanumerical digits of the first type and the alphanumerical digits of the second type;
verifying the user, at the server, by matching the alphanumeric code with a verification code set or stored by the server.

2. The method of claim 1, wherein the verification code is a password, an authentication code, or a challenge code.

3. The method of claim 1, the method further comprising:
providing instructions for the user to perform the sequence of click operations in a specified area on the screen of the device.

4. The method of claim 1, wherein
matching the alphanumeric code with the verification code set or stored by the server comprises comparing the alphanumeric code with the verification code set or stored by the server.

5. The method of claim 1,
wherein determining the click pattern characteristic of the sequence of click operations is performed at the device, and
wherein the method further comprises sending to the server the click pattern characteristic of the sequence of click operations made by the user.

6. The method of claim 1, wherein determining the click pattern characteristic of the sequence of click operations made by the user comprises:
receiving, at the server, operation information of the sequence of click operations made by the user; and
recognizing, at the server, the click pattern characteristic from the received operation information.

7. The method of claim 6, wherein determining the click pattern characteristic from the received operation information comprises:
determining the click pattern characteristic from the operation information of the selected click operations.

8. A method for verifying information comprising:
entering a verification code by a user in response to a maneuver prompted on a device, wherein the maneuver is defined according to the verification code set or stored by a server and wherein entering the verification code includes performing a sequence of click operations on a screen of the device within a specified time indicated by a time indicator on the screen of a device;
receiving, at the server, the sequence of click operations made by the user on the screen of the device, wherein each click operation corresponds to an alphanumerical digit of a code;

selecting, at the server, click operations with a click location in a designated area, with a click time falling in a designated time period, or with a click location in a designated area and a click time falling in a designated time period, the click location being coordinates of a point on the screen of the device where the click operation is made;
determining, at the server, a click pattern characteristic of the sequence of click operations made by the user,
wherein the click pattern characteristic including at least one of a count of clicks in the sequence, a click duration of each click in the sequence, or an order of the clicks in the sequence, and
wherein the click pattern characteristic encoded using a coding scheme including:
defining at least two ranges of click duration, and assigning an alphanumerical digit of a first type to each predefined range of click duration,
defining at least two ranges of inter-click interval, and assigning an alphanumerical digit of a second type to each predefined range of inter-click interval; and
generating an alphanumeric code by combining the alphanumerical digits of the first type and the alphanumerical digits of the second type;
verifying the user, at the server, by matching the alphanumeric code with the verification code set or stored by the server.

9. The method of claim 8, wherein the verification code is a password, an authentication code, or a challenge code.

10. The method of claim 8, wherein making a sequence of click operations comprises:
instructing the user to perform the sequence of click operations in a specified area on the screen of the device.

11. The method of claim 8, wherein
matching the alphanumeric code with the verification code set or stored by the server comprises comparing the alphanumeric code with the verification code set or stored by the server.

12. A computer-based apparatus for processing online information verification, the apparatus comprising:
a computer having a processor, computer-readable memory and storage medium, and I/O devices, the computer being programmed to have functional modules including:
a receiving module configured to receive a sequence of click operations made by a user on a screen of a device within a specified time indicated by a time indicator on the screen of the device, in response to a maneuver prompted on the device, wherein the maneuver is defined according to a verification code set or stored by a server, and wherein each click operation corresponds to an alphanumerical digit of a code;
a selecting module configured to select click operations with a click location in a designated area, with a click time falling in a designated time period, or with a click location in a designated area and a click time falling in a designated time period, the click location being coordinates of a point on the screen of the device where the click operation is made;
a determining module configured to determine a click pattern characteristic of the sequence of click operations made by the user,
wherein the click pattern characteristic include at least one of a count of clicks in the sequence, a click duration of each click in the sequence, or an order of the clicks in the sequence, and wherein the click pattern characteristic is encoded using a coding scheme including:

defining at least two ranges of click duration, and assigning an alphanumerical digit of a first type to each predefined range of click duration;

defining at least two ranges of inter-click interval; and assigning an alphanumerical digit of a second type to each predefined range of inter-click interval; and generating an alphanumeric code by combining the alphanumerical digits of the first type and the alphanumerical digits of the second type;

a verifying module configured to verify the user by matching the alphanumeric code of the sequence of click operations with the verification code set or stored by the server.

13. The method of claim 12, wherein the verification code is a password, an authentication code, or a challenge code.

14. The computer-based apparatus of claim 12, wherein the computer is programmed to further include:

a prompting module configured to prompt instructions for the user to perform the sequence of click operations in a specified area on the screen of the device.

* * * * *